United States Patent
Shin et al.

(10) Patent No.: US 10,088,625 B2
(45) Date of Patent: Oct. 2, 2018

(54) BACKLIGHT UNIT

(71) Applicant: SAMSUNG DISPLAY CO., LTD., Yongin-si, Gyeonggi-do (KR)

(72) Inventors: Junghoon Shin, Seongnam-si (KR); Youngchun Kim, Seoul (KR); Byoungdae Ye, Yongin-si (KR); Changyong Park, Bucheon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 330 days.

(21) Appl. No.: 14/941,137

(22) Filed: Nov. 13, 2015

(65) Prior Publication Data

US 2016/0139320 A1    May 19, 2016

(30) Foreign Application Priority Data

Nov. 19, 2014 (KR) .......................... 10-2014-0161743

(51) Int. Cl.
    *F21V 8/00* (2006.01)
(52) U.S. Cl.
    CPC .......... *G02B 6/0073* (2013.01); *G02B 6/0031* (2013.01); *G02B 6/0068* (2013.01); *G02B 6/0088* (2013.01)

(58) Field of Classification Search
    CPC .. G02B 6/0073; G02B 6/0031; G02B 6/0008; G02B 6/0088
    See application file for complete search history.

(56) References Cited

U.S. PATENT DOCUMENTS

| | | | |
|---|---|---|---|
| 2009/0180282 A1* | 7/2009 | Aylward | G02B 6/0021 362/245 |
| 2011/0304524 A1 | 12/2011 | Seen | |
| 2014/0192554 A1* | 7/2014 | Tomomasa | G02B 6/0088 362/606 |

FOREIGN PATENT DOCUMENTS

| | | |
|---|---|---|
| JP | 2012033310 | 2/2012 |
| KR | 1020100092695 | 8/2010 |
| KR | 1020110108480 | 10/2011 |
| KR | 1020110136069 | 12/2011 |

\* cited by examiner

*Primary Examiner* — Anabel Ton
(74) *Attorney, Agent, or Firm* — F. Chau & Associates, LLC.

(57) ABSTRACT

A backlight unit includes a printed circuit board; a light source on the printed circuit board; a light guide plate that receives light emitted from the light source on one surface and directs light outwards through another surface; and a light blocking unit between the light source and the light guide plate. The light blocking unit may be spaced apart from the light guide plate.

20 Claims, 4 Drawing Sheets

BACKLIGHT UNIT

CROSS-REFERENCE TO RELATED APPLICATION

This application claims priority under 35 U.S.C. § 119 from Korean Patent Application No. 10-2014-0161743, filed on Nov. 19, 2014 in the Korean Intellectual Property Office, and all the benefits accruing therefrom, the contents of which are herein incorporated by reference in their entirety.

BACKGROUND

1. Technical Field

Embodiments of the present disclosure are directed to a backlight unit that can reduce chromatic deviation of light directed by a light guide plate.

2. Discussion of the Related Art

Light emitting diodes (LEDs), which can be characterized by low power consumption and high efficiency, have been recently widely used as a light source of a backlight unit. The LEDs may be provided in a package form within a backlight unit. In this case, one package may include an LED chip and a fluorescent member, such as a phosphor, surrounding the LED chip. An LED chip generally emits blue light and the blue light may pass through the phosphor to be converted into white light.

In addition, in a structure where a lateral surface of an LED chip is positioned opposite to a light guide plate, light emitted toward the lateral surface of the LED chip may have a light path that is relatively longer than that of light emitted toward a front surface thereof, such that light emitted toward the lateral surface may mostly concentrate on end portions of the light guide plate. In other words, the light emitted toward the lateral surface may be concentrated on a light emitting surface of the light guide plate disposed far from an incident surface thereof.

Light emitted toward the lateral surface of the LED chip may appear yellowish compared to light emitted toward the front surface of the LED chip. That is because a proportion of white light to the light emitted toward the lateral surface of the LED chip is relatively low. Accordingly, light emitted toward the lateral surface of the LED chip may appear yellowish compared to the light emitted toward the front surface.

Therefore, in a conventional backlight unit, yellowish light may be relatively concentrated in a part of a light emitting surface of a light guide plate disposed far from a light incident surface, so that some level of yellowish color may appear in a corresponding area of a displayed image as compared other areas of the displayed image.

SUMMARY

Embodiments of the present disclosure are directed to a backlight unit that can reduce chromatic deviation of light directed by a light guide plate.

According to an embodiment of the present disclosure, a backlight unit includes: a printed circuit board; a light source on the printed circuit board; a light guide plate that receives light emitted from the light source on one surface and directs light outwards through another surface; and a light blocking unit between the light source and the light guide plate. The light blocking unit may be spaced apart from the light guide plate.

The light blocking unit may have a height greater than that of the light source and less than that of the light guide plate.

The light blocking unit may be disposed on the printed circuit board.

A cross-section of the light blocking unit may have a parabolic shape or a semi-parabolic shape.

A surface of the light blocking unit opposite to the light source may be higher than a surface thereof opposite to the light guide plate.

The backlight unit may further include a bottom case configured to accommodate the printed circuit board.

At least a part of the light blocking unit may be in contact with the bottom case.

The light blocking unit may be in contact with the printed circuit board.

The light blocking unit may include an opaque silicon material.

The backlight unit may further include a mold frame on the light source.

A side of the mold frame may be disposed on the light guide plate and another side of the mold frame may be disposed on the printed circuit board.

The mold frame may include a curved reflection surface.

The light source may include: a light emitting diode chip configured to emit light; and a fluorescent member that surrounds a front surface and side surfaces of the light emitting diode chip.

According to an embodiment of the present disclosure, a backlight unit includes a bottom case, a light source in the a bottom case, a light guide plate disposed in the bottom case proximal to the light source that receives light emitted from the light source on one surface and directs light outwards through another surface, and a light blocking unit between the light source and the light guide plate; the light blocking unit spaced apart from the light guide plate, wherein the light blocking unit blocks light emitted from the light source in a predetermined direction.

The backlight unit may further include a printed circuit board in the bottom case upon which the light source and light blocking unit are disposed.

The backlight unit may further include a mold frame on the light source, wherein a side of the mold frame is disposed on the light guide plate and another side of the mold frame is disposed on the printed circuit board, and the mold frame includes a curved reflection surface that connects the side disposed on the light guide plate to the side disposed on the printed circuit board.

The light blocking unit may include an opaque silicon material, may extend parallel to a light incident surface of the light guide plate wherein at least a one end of the light blocking unit is in contact with the bottom case, and may have a height greater than that of the light source and less than that of the light guide plate.

The light blocking unit may have a parabolic cross section or a semi-parabolic cross section.

A surface of the light blocking unit opposite to the light source may be higher than a surface thereof opposite to the light guide plate.

According to embodiments of the present disclosure, a backlight unit may have the following effects.

A light blocking unit according to the present disclosure may block light emitted from a lateral surface of an LED chip from being incident on a light guide plate. Accordingly, concentration of yellowish light on a predetermined light emitting surface of the light guide plate may be prevented or efficiently reduced.

DETAILED DESCRIPTION

Figure 1:
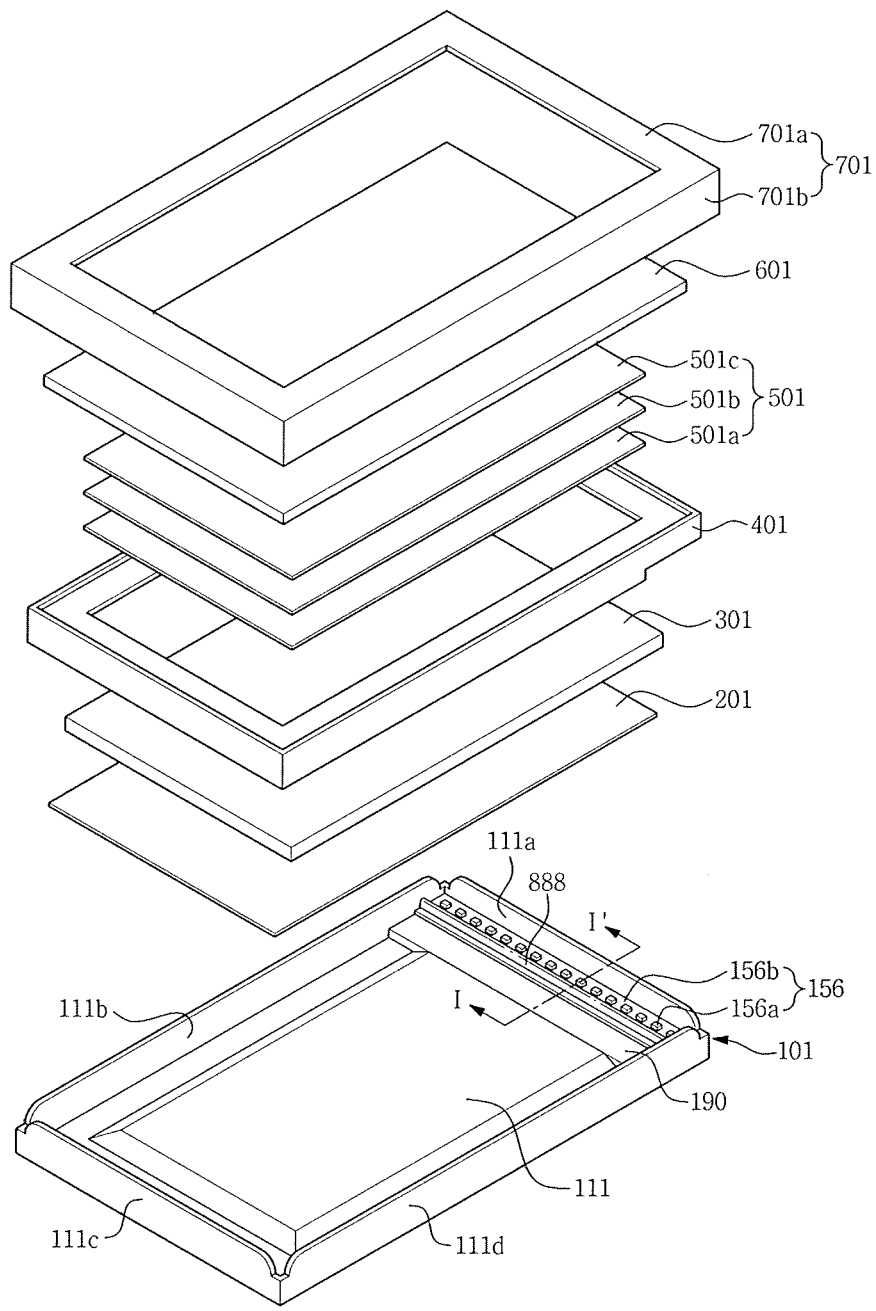
FIG. 1 illustrates a display device that includes a backlight unit according to an exemplary embodiment.

Features of the present disclosure and methods for achieving them will be made clear from embodiments described below in detail with reference to the accompanying drawings. The present disclosure may, however, be embodied in many different forms and should not be construed as being limited to the embodiments set forth herein. The present disclosure is merely defined by the scope of the claims. Like reference numerals may refer to like elements throughout the specification. The various figures are not necessarily to scale.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. It will be understood that when an element such as a layer, film, region, or substrate is referred to as being "on" another element, it can be directly on the other element or intervening elements may also be present.

Figure 2:
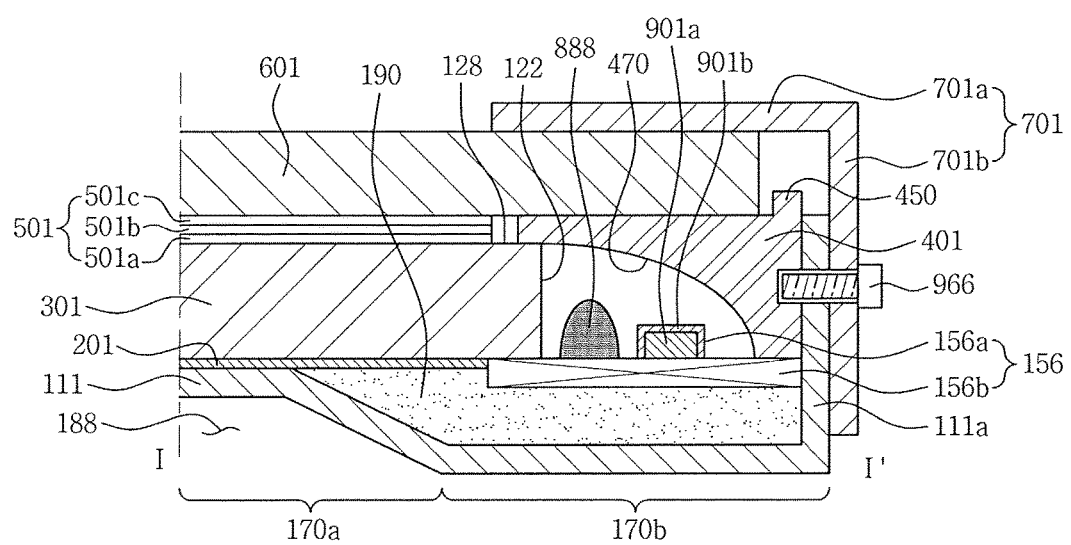
FIG. 2 is a cross-sectional view taken along line I-I' of FIG. 1.

FIG. 1 illustrates a display device that includes a backlight unit according to an exemplary embodiment, and FIG. 2 is a cross-sectional view taken along line I-I' of FIG. 1.

A display device according to an exemplary embodiment, as illustrated in FIGS. 1 and 2, may include a bottom case 101, a reflection sheet 201, a light guide plate 301, an optical sheet 501, a light source module 156, a mold frame 401, a display panel 601 and a top case 701. Herein, a structure including the light source module 156, the reflection sheet 201, the light guide plate 301, the mold frame 401, and the optical sheet 501 is called a backlight unit. The display panel 601 and the backlight unit may be assembled in a laminated structure to form a display module. The display module may further include the top chassis 701 and the bottom case 101 configured to protect and fix the display panel 601 and the backlight unit, and a driving circuit board configured to drive the display panel 601.

The display panel 601 may display images. The display panel 601 may be divided into a display area and a non-display area. An image may be displayed in the display area, and signal lines configured to transmit image data, various control signals and various power signals for displaying the image may be provided in the non-display area. Further, circuit units configured to provide the image data, various control signals, and various power signals may be partially or entirely provided on the non-display area or on the driving circuit board.

The display panel 601 according to an exemplary embodiment may be a liquid crystal panel that includes a lower substrate, an upper substrate, and a liquid crystal layer interposed between the lower substrate and the upper substrate. Herein, the lower substrate may include a plurality of gate lines, a plurality of data lines intersecting the gate lines, pixel electrodes formed on each pixel region, and a thin film transistor (TFT) operated by a gate signal applied from the gate line to provide a data signal received from the data line to the pixel electrode. Further, the upper substrate may include a plurality of color filters disposed corresponding to each pixel region.

In addition, the display panel 601 according to an exemplary embodiment may not be limited to a liquid crystal panel. Any panel type structure capable of displaying images, such as an organic light emitting display panel, may be used as the display panel 601.

The bottom case 101, as illustrated in FIG. 1, may have an accommodation area therein. In the accommodation area, a heat dissipation plate 190, the light source module 156, the reflection sheet 201, the light guide plate 301, the mold frame 401, and the optical sheet 501 may be disposed. To secure the accommodation area, the bottom case 101 may have a quadrilateral-shaped base portion 111 with first, second, third and fourth side portions 111a, 111b, 111c, and 111d disposed at each edge portion of the base portion 111. A space surrounded by the first, second, third, and fourth side portions 111a, 111b, 111c, and 111d and the base portion 111 may be defined as the accommodation area.

The first and third side portions 111a and 111c may have a length that is shorter than that of the second and fourth side portions 111b and 111d.

The first, second, third, and fourth side portions 111a, 111b, 111c, and 111d may protrude from the respective edge portions of the base portion 111 toward the top case 701 with a predetermined height. The first, second, third, and fourth side portions 111a, 111b, 111c, and 111d may be fixed to the base portion 111. The first, second, third, and fourth side portions 111a, 111b, 111c, and 111d may be integrally formed with the bottom case 101 into a single unit.

In addition, the base portion 111, as illustrated in FIG. 2, may be divided into a center portion 170a and four peripheral portions 170b that surround the center portion 170a. Each of the peripheral portions 170b may include a corresponding edge portion of the base portion 111. In other words, an end portion of each peripheral portion 170b may correspond to an edge portion of the base portion 111. Herein, the center portion 170a may be raised higher than the peripheral portions 170b. In other words, the center portion 170a may be raised closer to the light guide plate 301 than the peripheral portions 170b. Accordingly, a rear surface of the base portion 111 may be indented in the center portion thereof to form an indentation. In the indentation 188 of the base portion 111, various driving circuits for operating the display panel may be disposed. In addition, each edge portion of the center portion 170a may form an inclined surface. Each of the inclined surfaces gradually extend downward toward each of the peripheral portions 170b.

The heat dissipation plate 190 may release heat generated in the light source 156a outwards through the bottom case 101. For this purpose, a part of the heat dissipation plate 190 may be in physical contact with the light source 156a, the base portion 111, and one of the side portions. The heat dissipation plate 190 may include a metal, such as aluminum. The heat dissipation plate 190 may be disposed on the base portion 111 of the bottom case 101. In some embodiments, the heat dissipation plate 190 may be disposed on one of the peripheral portions 170b of the base portion 111. For example, the heat dissipation plate 190, as illustrated in FIG. 2, may be disposed on a peripheral portion 170b that includes an edge portion on which the first side portion 111a is disposed. In addition, the heat dissipation plate 190 may further extend toward the center portion 170a. For example, the heat dissipation plate 190, as illustrated in FIG. 2, may extend to an edge portion of an inclined portion of the center portion 170a.

The light source module 156 may provide light. The light source module 156 may be disposed on the heat dissipation plate 190. In addition, the heat dissipation plate 190, as illustrated in FIG. 2, may also have an indentation, and in this case, a part of the light source module 156 may be inserted into the indentation of the heat dissipation plate 190. For example, the light source module 156, as illustrated in FIGS. 1 and 2, may include a printed circuit board 156b and at least one light source 156a. A part of the printed circuit board 156b may be inserted into the indentation.

A surface of the printed circuit board 156b may be divided into at least one mounting area and a wiring area. When two or more light sources 156a are provided, one light source may be provided on each mounting area, and a plurality of signal transmission lines for transmitting a driving power to the light sources are provided on the wiring area. The driving power may be generated by an external power supply and may be provided to the plurality of signal transmission lines through a separate connector. The printed circuit board 156b may include metals, to more efficiently transmit heat generated in the light source 156a to the heat dissipation plate 190.

The light source 156a may be operated by the driving power to emit light outwards. The light source 156a may be disposed on the printed circuit board 156b. The light source 156a may include at least one light emitting diode (LED) chip 901a that emits light arranged in a line that extends parallel to the first side 111a, each LED including a fluorescent member 901b, such as a phosphor, surrounding the LED chip 901a. Herein, the LED chip 901a may be an LED chip that emits blue light. The blue light emitted from the LED chip 901a may pass through the phosphor 901b to be converted into white light.

The reflection sheet 201 may be disposed on the center portion 170a of the base portion 111. The reflection sheet 201 may extend toward each of the peripheral portions 170b. In this case, a part of the reflection sheet 201 extending toward the heat dissipation plate 190 may be disposed on the heat dissipation plate 190. The reflection sheet 201 may reflect light emitted through a lower external surface of the light guide plate 301 back to the light guide plate 301, thereby reducing light loss. The reflection sheet 201 may include, for example, polyethylene terephthalate (PET), and thus may be reflective. One surface of the reflective sheet 201 may be coated with a diffusion layer containing, for example, titanium dioxides. Further, the reflective sheet 201 may be formed of a material containing metal, such as silver (Ag).

The light guide plate 301 may be disposed on the reflection sheet 201. The light guide plate 301 may extend toward the printed circuit board 156b and in this case, an incident surface of the light guide plate 301 may be disposed between the printed circuit board 156b and the mold frame 401.

The light guide plate 301 may guide light received from the light source 156a to the display panel 601. In this case, the light guide plate 301 may uniformly provide light received from the light source 156a to an entire surface of the display area of the display panel 601.

The light guide plate 301 may have a polyhedron shape. Among a plurality of surfaces of the light guide plate 301, a surface opposite to the light source is defined as an incident surface 122 and a surface opposite to the display panel 601 is defined as a light emitting surface 128. Light emitted from the light source 156a may be incident on the light incident surface 122 of the light guide plate 301. Then, the incident light may propagate inside of the light guide plate 301. The light propagating inside of the light guide plate 301 may be totally reflected and guided outwards through the light emitting surface 128 by the light guide plate 301. The light guided outwards through the light emitting surface 128 may pass through the optical sheet 501 to the display area of the display panel 601.

In addition, to improve reflectivity of the light guide plate 301, a plurality of light scattering patterns may be defined on a lower external surface of the light guide plate 301. In this case, gaps between the light scattering patterns may increase with increasing distance from the light incident surface 122 of the light guide plate 301. Herein, the lower external surface of the light guide plate 301 refers to a surface surfaces of the light guide plate 301 that is opposite to the reflection sheet 201.

The light guide plate 301 may include a light-transmissive material to efficiently guide light. The light-transmissive material may include an acrylic resin, such as polymethylmethacrylate (PMMA), or polycarbonate (PC).

The optical sheet 501 may diffuse and/or collimate light received from the light guide plate 301 and may be disposed between the light guide plate 301 and the display panel 601. The optical sheet 501 may include a diffusion sheet 501a, a prism sheet 501b, and a protection sheet 501c. The diffusion sheet 501a, the prism sheet 501b, and the protection sheet 501c may be sequentially laminated on the light guide plate 301 in the order listed.

The diffusion sheet 501a may disperse light received from the light guide plate 301 to prevent the light from being concentrated.

The prism sheet 501b may be disposed on the diffusion sheet 501a and may collimate diffused light received from the diffusion sheet 501 in a direction perpendicular to the display panel 601. For this purpose, the prism sheet 501b may include prisms having a triangular cross-section that form a predetermined array on one surface thereof.

The protection sheet 501c may be disposed on the diffusion sheet 501b and may serve to protect a surface of the prism sheet 501b and to diffuse light to uniformly distribute the light. Light exiting the protection sheet 501c may be guided to the display panel 601.

The mold frame 401 may have a quadrangular frame shape having an opening in the center portion thereof. One side of the mold frame 401 may be disposed on an edge portion of the light guide plate 301 and another side of the mold frame 401 may be disposed on the base portion 111 and on the printed circuit board 156b. That is, a part of the mold frame disposed on a peripheral portion, hereinafter referred to as a first peripheral portion, that includes the first side portion 111a may be disposed on the printed circuit board 156b, and a part of the mold frame disposed on a peripheral portion excluding the first peripheral portion may be disposed on the base portion 111.

Further, the part of the mold frame on the first peripheral portion may have a reflection surface 470. The reflection surface 470 may have a curved shape that connects the side disposed on an edge portion of the light guide plate 301 to the side disposed on the printed circuit board 156a. A reflection tape may be attached to the reflection surface 470. Light emitted from the light source 156a may be reflected by the reflection tape to be incident on the light guide plate 301.

The mold frame 401 may further include a protrusion 450. The protrusion 450 may protrude from an edge portion of the mold frame 401 toward the top case 701 and may surround the display panel 601. The protrusion 450 may define a space for the display panel 601 to be mounted on.

In addition, as illustrated in FIG. 1, a part of the mold frame 401 on the light source module 156 may be thinner than the other part of the mold frame 401.

The top case 701, as illustrated in FIGS. 1 and 2, may have an aperture through which the display area of the display panel 601 is exposed. That is, the top case 701 may have a quadrangular frame shape with an opening in the center portion. The top case 701 may cover an edge portion of the display panel and may partially cover the first, second, third, and fourth side portions 111a, 111b, 111c, and 111d. For this purpose, the top case 701 may include an upper cover 701a covering an edge portion of the display panel and a side cover 701b partially covering the first, second, third, and fourth side portions 111a, 111b, 111c, and 111d.

The top case 701, the bottom case 101, and the mold frame 401 may be coupled to each other by a coupling means 966. For this purpose, the top case 701 may have a first coupling hole that extends through the side cover 701b, the bottom case 101 may have a second coupling hole extending through each of the first, second, third, and fourth side portions 111a, 111b, 111c, and 111d, and the mold frame 401 may have a coupling cavity. The coupling means 966 may sequentially pass through the first and second coupling holes to be inserted into the coupling cavity.

A light blocking unit 888 may be disposed between the light guide plate 301 and the light source 156a at a predetermined distance from the light guide plate 301. The light blocking unit 888 may be disposed on the printed circuit board 156b and in this case, the light blocking unit 888 and on the printed circuit board 156b may be in contact with each other.

A cross-section of the light blocking unit 888 may have a parabolic shape. The light blocking unit 888 may have a height greater than that of the light source 156a and less than that of the light guide plate 301.

In addition, a cross-section of the light blocking unit 888 may have a semi-parabolic shape. In this case, the light blocking unit 888 has a flat surface facing the light incident surface 122 of the light guide plate 301

The light blocking unit 888 may block light emitted from the light source 156a that is propagating in a predetermined direction. For this purpose, the light blocking unit 888 may include opaque silicon materials.

Figure 3:
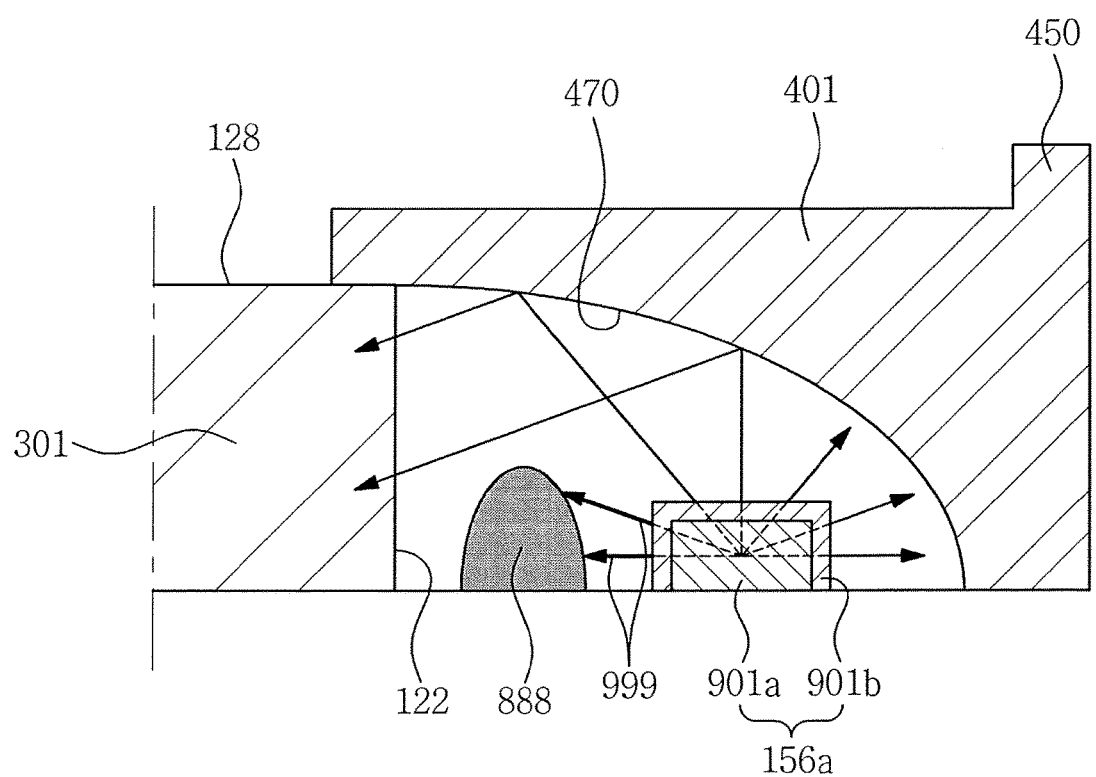
FIG. 3 illustrates an example where a light blocking unit of FIG. 1 blocks predetermined light emitted from a light source.

FIG. 3 illustrates an example where the light blocking unit of FIG. 1 blocks predetermined light emitted from the light source.

The light blocking unit 888 may block light emitted from the light source 156a that propagates in a predetermined direction. That is, the light blocking unit 888 may block the predetermined light from being incident to the light guide plate 301. The light blocking unit 888, as illustrated in FIG. 3, may block light emitted from a side surface of the light source 156a that is opposite to the light guide plate 301.

In addition, an internal angle between two arrows 999 illustrated in FIG. 3 may be about 62.5°. In other words, light emitted from the side surface of the light source 156a opposite to the light incident surface 122 of the light guide plate 301 that is within an angle of about 62.5° may be blocked by the light blocking unit 888. That is, the light blocking unit 888 may have a height suitable to block light within the angle of 62.5°.

Accordingly, due to the light blocking unit 888, light emitted from the side surface of the light source 156a may not be incident to the light guide plate 301. Accordingly, a present exemplary embodiment may prevent yellowish light emitted from the side surface of the light source 156a from concentrating in a predetermined portion of the light emitting surface of the light guide plate 301.

Figure 4:
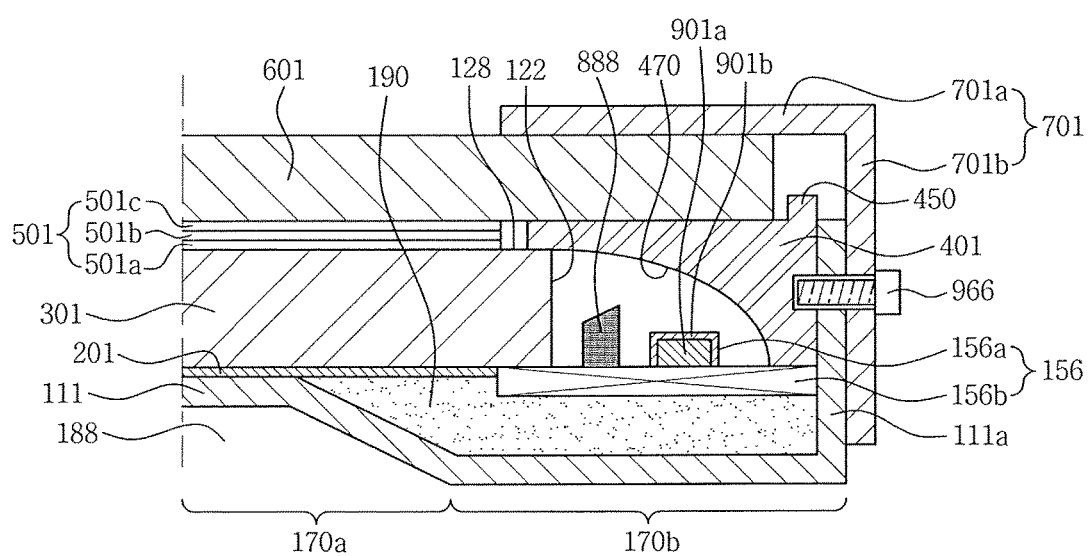
FIG. 4 illustrates a light blocking unit according to another exemplary embodiment.

FIG. 4 illustrates a light blocking unit according to another exemplary embodiment.

The light blocking unit 888, as illustrated in FIG. 4, may have a polyhedron shape. In this case, a side of the light blocking unit 888 opposite to a light source 156a may higher than a side thereof opposite to a light guide plate 301. In this case, an upper surface of the light blocking unit 888 may be inclined. As the light blocking unit 888 has an inclined surface, light reflected off a reflection surface 470 of a mold frame 401 and incident to the inclined surface may be directed toward a light guide plate 301.

In addition, at least a part of the light blocking unit 888 may be in contact with the bottom case. For example, as illustrated in FIG. 1, the light blocking unit 888 may extend in a direction parallel to the light incident surface of the light guide plate and the first side portion 111a of the bottom case 101, and both end portions of the light blocking unit 888 may be in contact with the bottom case 101. In this case, heat generated from the light source 156a may be released outwards through the light blocking unit 888 and the bottom case 101.

From the foregoing, it will be appreciated that various exemplary embodiments in accordance with the present disclosure have been described herein for purposes of illustration, and that various modifications may be made without departing from the scope and spirit of the present teachings. Accordingly, the exemplary embodiments disclosed herein are not intended to be limiting of the true scope and spirit of the present teachings. Various features of the above described and other embodiments can be mixed and matched in any manner, to produce further embodiments consistent with the disclosure.

What is claimed is:

1. A backlight unit comprising:
   a printed circuit board;
   a light source on the printed circuit board;
   a light guide plate that receives light emitted from the light source on one surface and directs light outwards through another surface; and
   a light blocking unit between the light source and the light guide plate; the light blocking unit spaced apart from the light guide plate.

2. The backlight unit of claim 1, wherein the light blocking unit has a height greater than that of the light source and less than that of the light guide plate.

3. The backlight unit of claim 1, wherein the light blocking unit is disposed on the printed circuit board.

4. The backlight unit of claim 1, wherein a cross-section of the light blocking unit has a parabolic shape or a semi-parabolic shape.

5. The backlight unit of claim 1, wherein a surface of the light blocking unit opposite to the light source is higher than a surface thereof opposite to the light guide plate.

6. The backlight unit of claim 1, further comprising a bottom case configured to accommodate the printed circuit board.

7. The backlight unit of claim 6, wherein at least a one end of the light blocking unit is in contact with the bottom case.

8. The backlight unit of claim 1, wherein the light blocking unit is disposed on the printed circuit board.

9. The backlight unit of claim 1, wherein the light blocking unit is in contact with the printed circuit board.

10. The backlight unit of claim 1, wherein the light blocking unit comprises an opaque silicon material.

11. The backlight unit of claim 1, further comprising a mold frame on the light source.

12. The backlight unit of claim 11, wherein a side of the mold frame is disposed on the light guide plate and another side of the mold frame is disposed on the printed circuit board.

13. The backlight unit of claim 11, wherein the mold frame includes a curved reflection surface.

14. The backlight unit of claim 1, wherein the light source comprises:
   a light emitting diode chip configured to emit light; and
   a fluorescent member that surrounds a front surface and side surfaces of the light emitting diode chip.

15. A backlight unit comprising:
   a bottom case;
   a light source in the a bottom case;
   a light guide plate disposed in the bottom case proximal to the light source that receives light emitted from the light source on one surface and directs light outwards through another surface; and
   a light blocking unit between the light source and the light guide plate; the light blocking unit spaced apart from the light guide plate, wherein the light blocking unit blocks light emitted from the light source in a predetermined direction.

16. The backlight unit of claim 15, further comprising:
   a printed circuit board in the bottom case upon which the light source and light blocking unit are disposed.

17. The backlight unit of claim 15, further comprising a mold frame on the light source,
   wherein a side of the mold frame is disposed on the light guide plate and another side of the mold frame is disposed on the printed circuit board, and the mold frame includes a curved reflection surface that connects the side disposed on the light guide plate to the side disposed on the printed circuit board.

18. The backlight unit of claim 15, wherein the light blocking unit comprises an opaque silicon material, extends parallel to a light incident surface of the light guide plate wherein at least a one end of the light blocking unit is in contact with the bottom case, and has a height greater than that of the light source and less than that of the light guide plate.

19. The backlight unit of claim 15, wherein the light blocking unit has a parabolic cross section.

20. The backlight unit of claim 15, wherein a surface of the light blocking unit opposite to the light source is higher than a surface thereof opposite to the light guide plate.

* * * * *